United States Patent
Migicovsky et al.

(10) Patent No.: US 9,877,301 B2
(45) Date of Patent: **\*Jan. 23, 2018**

(54) SYSTEM AND METHOD FOR ALERTING A USER ON AN EXTERNAL DEVICE OF NOTIFICATIONS OR ALERTS ORIGINATING FROM A NETWORK-CONNECTED DEVICE

(71) Applicant: Fitbit, Inc., San Francisco, CA (US)

(72) Inventors: Eric B. Migicovsky, Vancouver (CA); Jonathan V. Bennett, Waterloo (CA); Cory D. Snider, Richmond Hill (CA)

(73) Assignee: Fitbit, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,526

(22) Filed: Apr. 14, 2015

(65) Prior Publication Data
US 2015/0223033 A1 Aug. 6, 2015

Related U.S. Application Data

(63) Continuation of application No. 13/511,531, filed as application No. PCT/CA2010/001870 on Nov. 25, 2010.
(Continued)

(51) Int. Cl.
*H04M 1/725* (2006.01)
*H04W 68/02* (2009.01)
(Continued)

(52) U.S. Cl.
CPC ........... *H04W 68/02* (2013.01); *H04L 1/1867* (2013.01); *H04L 41/06* (2013.01);
(Continued)

(58) Field of Classification Search
CPC ................................ H04W 4/12; H04W 3/537
See application file for complete search history.

(56) References Cited

U.S. PATENT DOCUMENTS

| | | | |
|---|---|---|---|
| 5,552,779 | A | 9/1996 | Gaskill et al. |
| 6,118,979 | A | 9/2000 | Powell |

(Continued)

FOREIGN PATENT DOCUMENTS

| | | |
|---|---|---|
| EP | 1587334 | 10/2005 |
| EP | 2504961 | 10/2012 |

(Continued)

OTHER PUBLICATIONS

European Search Report in Application No. 10832467 dated Apr. 12, 2013, 10 pages.
(Continued)

*Primary Examiner* — Shantell L Heiber
(74) *Attorney, Agent, or Firm* — Hogan Lovells US LLP

(57) ABSTRACT

Users are experiencing an increasing number of alerts and notifications on their mobile devices. When it is inconvenient or not possible to view the network-connected device, an accessory can be used to save time and avoid missing notifications. A system comprising a network-connected device and an accessory are provided to address these problems. The accessory is capable of notifying the user of alerts from the network-connected device, allowing the user to quickly be advised of alerts without needing to first interact with the network-connected device. The system includes a method to selectively filter alerts so as to avoid unnecessarily interrupting the user in cases where the network device is inaccessible. The system is also capable of pushing new interface designs and themes from the network device to the accessory to alter the appearance and configuration of its display.

27 Claims, 11 Drawing Sheets

Related U.S. Application Data

(60) Provisional application No. 61/264,540, filed on Nov. 25, 2009.

(51) Int. Cl.

| | | |
|---|---|---|
| *H04L 1/18* | (2006.01) | |
| *H04L 12/24* | (2006.01) | |
| *H04L 12/26* | (2006.01) | |
| *H04L 12/58* | (2006.01) | |
| *H04L 29/08* | (2006.01) | |
| *H04W 4/00* | (2009.01) | |
| *H04W 4/12* | (2009.01) | |
| *H04W 8/18* | (2009.01) | |
| *H04L 12/18* | (2006.01) | |
| *H04L 29/06* | (2006.01) | |
| *H04M 1/56* | (2006.01) | |
| *H04M 1/57* | (2006.01) | |
| *H04W 88/06* | (2009.01) | |

(52) U.S. Cl.
CPC .......... *H04L 43/0811* (2013.01); *H04L 51/24* (2013.01); *H04L 67/26* (2013.01); *H04L 67/36* (2013.01); *H04M 1/7253* (2013.01); *H04M 1/72527* (2013.01); *H04M 1/72597* (2013.01); *H04W 4/008* (2013.01); *H04W 4/12* (2013.01); *H04W 8/183* (2013.01); *H04L 12/189* (2013.01); *H04L 12/1895* (2013.01); *H04L 51/38* (2013.01); *H04L 63/123* (2013.01); *H04L 67/04* (2013.01); *H04L 67/322* (2013.01); *H04M 1/56* (2013.01); *H04M 1/575* (2013.01); *H04M 1/72552* (2013.01); *H04M 2250/02* (2013.01); *H04M 2250/60* (2013.01); *H04W 88/06* (2013.01)

(56) References Cited

U.S. PATENT DOCUMENTS

| | | | |
|---|---|---|---|
| 6,158,884 A | 12/2000 | Lebby et al. | |
| 6,525,997 B1 | 2/2003 | Narayanaswami et al. | |
| 6,714,486 B2 | 3/2004 | Biggs | |
| 6,922,722 B1 | 7/2005 | Mann et al. | |
| 6,977,868 B2 | 12/2005 | Brewer et al. | |
| 7,206,833 B1 | 4/2007 | Sarangam et al. | |
| 7,392,039 B2 | 6/2008 | Souissi et al. | |
| 7,924,844 B1 | 4/2011 | Defrang et al. | |
| D733,142 S | 6/2015 | Solomon et al. | |
| D743,278 S | 11/2015 | Solomon et al. | |
| D745,515 S | 12/2015 | Solomon et al. | |
| 2002/0009989 A1 | 1/2002 | Kanesaka et al. | |
| 2002/0115478 A1* | 8/2002 | Fujisawa et al. | 455/567 |
| 2004/0198411 A1 | 10/2004 | Cheng et al. | |
| 2005/0091501 A1 | 4/2005 | Osthoff et al. | |
| 2006/0179127 A1 | 8/2006 | Randall | |
| 2007/0191034 A1* | 8/2007 | Lee et al. | 455/466 |
| 2008/0167014 A1 | 7/2008 | Novick et al. | |
| 2008/0189592 A1 | 8/2008 | Lee et al. | |
| 2009/0054039 A1* | 2/2009 | van Wijk et al. | 455/412.1 |
| 2009/0054091 A1 | 2/2009 | van Wijk et al. | |
| 2009/0088207 A1 | 4/2009 | Sweeney et al. | |
| 2009/0258633 A1 | 10/2009 | Kim et al. | |
| 2009/0275351 A1 | 11/2009 | Jeung et al. | |
| 2010/0004933 A1 | 1/2010 | Sweeney et al. | |
| 2010/0042470 A1 | 2/2010 | Chang et al. | |
| 2010/0130174 A1 | 5/2010 | Venkob et al. | |
| 2010/0227631 A1* | 9/2010 | Bolton et al. | 455/466 |
| 2010/0304741 A1* | 12/2010 | Gogic et al. | 455/434 |
| 2013/0040610 A1 | 2/2013 | Migicovsky et al. | |
| 2015/0126117 A1 | 5/2015 | Wong et al. | |
| 2015/0223033 A1 | 8/2015 | Migicovsky et al. | |
| 2015/0223034 A1 | 8/2015 | Migicovsky et al. | |
| 2015/0333302 A1 | 11/2015 | Johns et al. | |
| 2015/0334772 A1 | 11/2015 | Wong et al. | |

FOREIGN PATENT DOCUMENTS

| | | |
|---|---|---|
| EP | 002655142-0001 | 3/2015 |
| EP | 002655118-0001 | 4/2015 |
| GB | 2422750 | 8/2006 |
| WO | 9852106 | 11/1998 |

OTHER PUBLICATIONS

International Search Report and Written Opinion for PCT/CA2010/001870, dated Apr. 13, 2011, 8 pages.

* cited by examiner

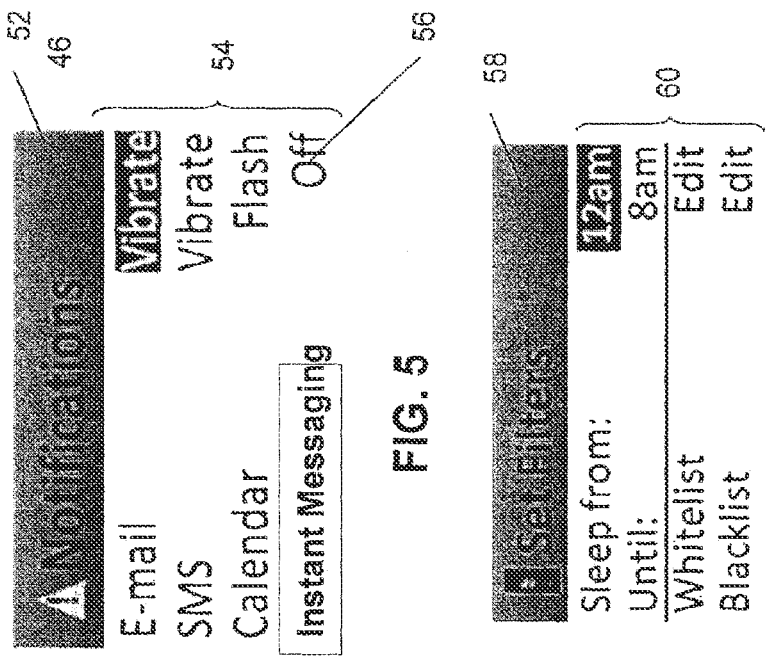
FIG. 5
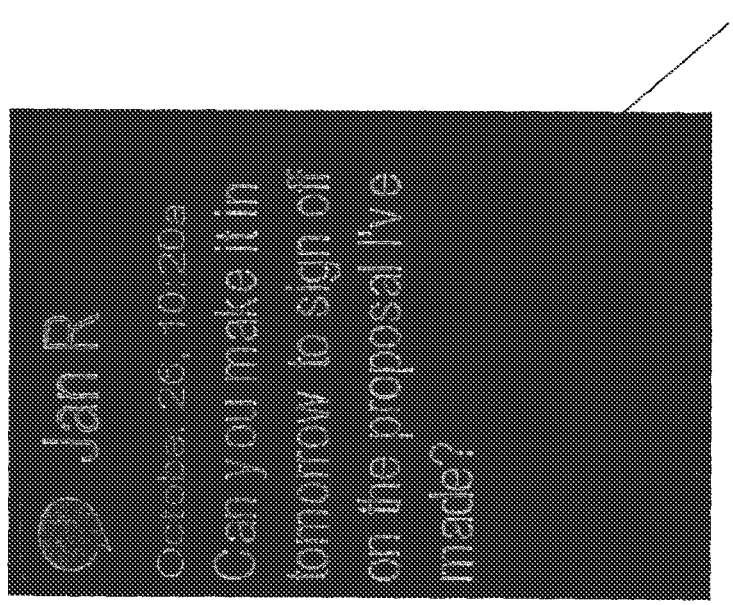
FIG. 6
FIG. 4F

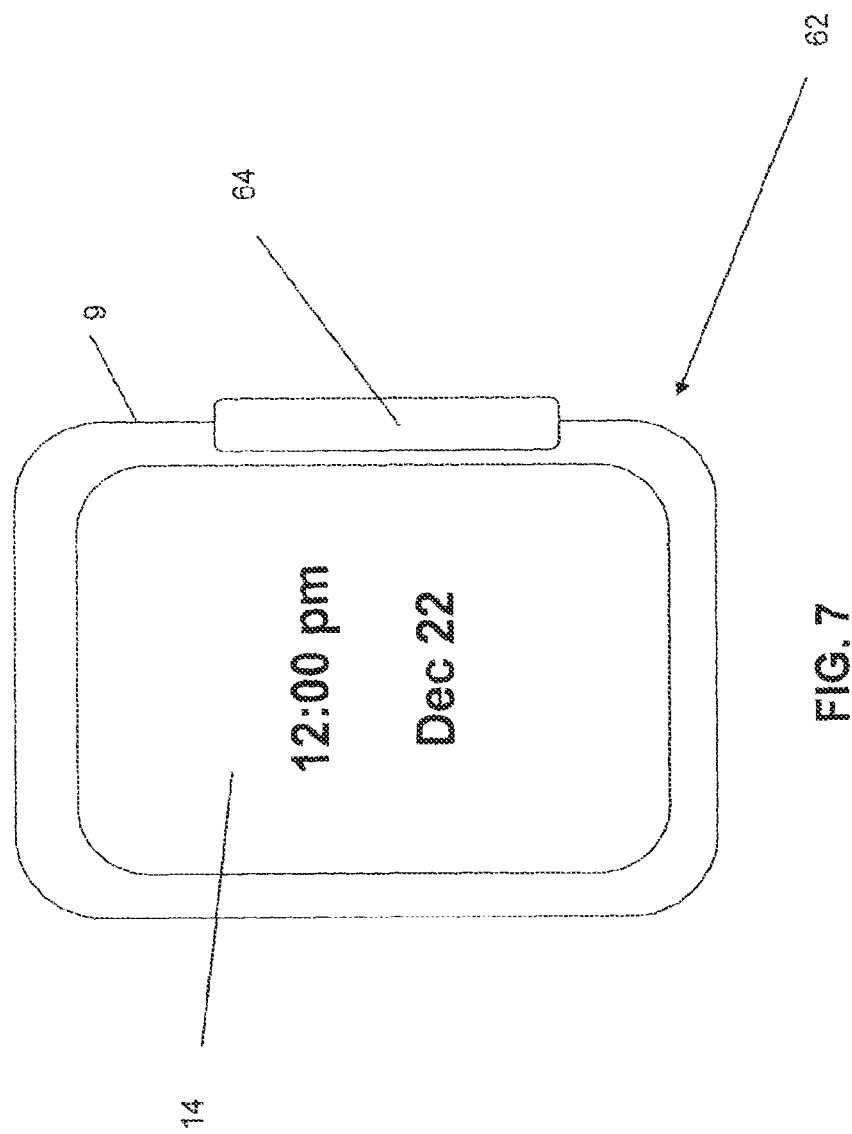

SYSTEM AND METHOD FOR ALERTING A USER ON AN EXTERNAL DEVICE OF NOTIFICATIONS OR ALERTS ORIGINATING FROM A NETWORK-CONNECTED DEVICE

This application is a continuation of U.S. application Ser. No. 13/511,531, which was filed on Nov. 25, 2010 as International Application No. PCT/CA2010/001870 and entered the National Stage on Oct. 26, 2012 claims priority from U.S. Provisional Application No. 61/264,540 filed on Nov. 25, 2009, both of which are incorporated herein by reference in their entireties.

FIELD OF THE INVENTION

The invention relates to systems and methods for alerting a user on an external device of notifications or alerts originating from a network-connected device.

BACKGROUND

Recently, users are turning to more sophisticated personal digital assistants (PDAs) rather than more basic network-connected devices such as cell phones. Mobile phones that have the capability to send and receive data via data subscriptions to a network have become more prevalent. The capabilities of these mobile phones, often referred to as "smart phones", have led to them being viewed more as mobile computers rather than simplistic communication devices. Smart phones also often feature short range wireless transmitters and protocols, such as Bluetooth, specifically designed for communicating with other devices or accessories nearby.

Bluetooth watches in the past have been provided which support caller ID and text messages. However, the information it displayed was brief as it was limited to a one-line display.

There exists a method for synchronizing data between a watch and an external digital device as described in U.S. Pat. No. 6,977,868 to Brewer et al. This method requires the user to initiate the synchronization by contacting the watch display, which causes the microprocessor in the watch to activate and begin the synchronization process. Consequently, the user is not able to instantly check for new data by looking at the watch. The user must wait for the microprocessor to activate and complete the synchronization process prior to the information being displayed. This also means that the user may not receive new data in a timely manner, since this technology does not notify the user when there are updates available. Furthermore, this solution can require an "alignment device" to aid the wireless communication link between a watch and PDA. In this case, a high level of user interaction is required. Furthermore, the communication is a synchronization, which lengthens the time the wireless communication is active and negatively impacts battery life.

U.S. Pat. No. 6,714,486 to Biggs teaches a system and method for customized time display. Biggs is concerned with displaying time and other chronological data on a display of a portable timepiece. However, the data is sent to the display as image parameter data rather than raw text. The disadvantage of this is that a more complex hardware design is needed to support the memory required for storing and displaying image data.

U.S. Pat. No. 6,118,979 to Powell teaches a method of indicating an incoming call through a remotely located receiving device. This avoids situations where a cell phone would audibly ring at the same time as the external device vibrates, as they both indicate the same event of an incoming call. However, this solution only concerns the signaling of incoming telephone calls by an external device. There exists a switch for whether the incoming call is connected or disconnected to the audible signaling system of the transmitter.

U.S. Pat. No. 6,525,997 to Narayanaswami concerns a wearable wristwatch that can connect wirelessly to another source to access information, and it then uses software to display it in a specified orientation. It can vary the size of the displayed objects (such as the hour and minute hands of the clock) depending on the orientation. It uses a touch screen as a method of input. One disadvantage of this is that the watch display changes in size when set in elliptical mode. That is, the minute and hour hands of the watch face shorten and elongate depending on the angle. This could cause readability issues for users because the hands are continually changing sizes. Another disadvantage of the elliptical mode is that screen real estate is wasted in that the watch display is not using the majority of the screen. The ellipse shape necessitates that the watch dial be smaller than the ideal circular or square configuration.

U.S. Pat. No. 5,552,779 to Gaskill et al. deals with a paging device that can receive messages and can display them while also displaying icons. The icons can change to indicate which type of message has been received by the device, and Gaskill discusses how each message should be numbered and what the device should do in the case that the user is looking at one message while another is received. An icon is displayed if a message number indicates that a message has been missed. A disadvantage with this solution is that all messages are stored on the "pager" device itself, and its storage can fill up if the user does not delete any previously stored messages. Another disadvantage is that this is a paging device, meaning that it links wirelessly to a network by itself. For practical purposes, the user would need to carry a cell phone or smart phone with a separate data and/or voice plan in order to return a call or respond to a message.

It is therefore an object of the following to address at least one of the above-noted disadvantages.

SUMMARY OF THE INVENTION

A system and method are provided for alerting a user of notifications or alerts originating from a network-connected device by using an external device. In some embodiments, the system detects and filters alerts on the network-connected device and transmits and presents the alerts via a communication link to the external device. The system also enables customization and changeability of the external device interface.

In one aspect, there is provided a method of communicating alerts or notifications originating from a network or a network connected device to an external device to enable the external device to provide the alerts or notifications, the method comprising: detecting an alert or notification on the network connected device; sending data from the network connected device which is associated with the alert or notification; determining if an acknowledgement of receipt of the data has been sent by the external device; and if the acknowledgement is not received by the network connected device, storing the data for subsequent transmission.

In another aspect, there is provided a method of an external device receiving alerts or notifications originating from a network or a network connected device to enable the external device to provide the alerts or notifications, the method comprising: detecting a wireless signal using a wireless antenna; receiving data from the network connected device, the data being associated with a particular alert or notification; returning an acknowledgement to the network connected device to confirm a successful transfer of the data; and providing the data on the external device.

In yet another aspect, there is provided a method of determining whether data associated with an alert or notification detected on a network connected device should be delivered to an external device, the method comprising: providing a filtering application on the network connected device; enabling one or more parameters to be set to dictate within the filtering application, how to determine a priority of alerts or notifications at the time the alerts or notifications are received; if the filtering application determines it is acceptable to provide data associated with the alert or notification to the external device, the network connected device sending data for the external device to receive; determining if an acknowledgement of receipt of the data has been sent by the external device; and if an acknowledgement has not been detected, storing the alert or notification for subsequent transmission.

In yet another aspect, there is provided a method of an external device obtaining a new interface from a network connected device to enable the external device to utilize the new interface, the method comprising: the external device receiving new data from the network connected device, the new data comprising any one or more of an new interface display, and a setting that has changed from a present setting to a new setting; the external device storing the new data in a memory; and the external device updating a display to reflect the new interface, the new setting, or both.

In yet another aspect, there is provided a method of an external device obtaining a new operating system (OS) from a network connected device to enable the external device to install the new OS, the method comprising: the external device receiving new data from the network connected device, the new data comprising data for obtaining or directly installing the new OS; the external device storing the new data in a memory; and the external device installing the new OS using the new data.

In yet another aspect, there is provided a method for conserving power in an external device configured to receive data from a network connected device, the method comprising: sampling the wireless spectrum periodically using a wireless module within the external device to receive any wireless transmissions that may have originated from the network device since a previous sample was taken; if the sampled data is not already stored in a memory of the external device from the previous sample, updating the memory of the external device to include new data from the network device; and providing a data transmission to the network connected device to confirm data was received.

In yet another aspect, there is provided a method for transmitting data from a network connected device to an external device without visibly notifying a user of the external device, the data being associated with an alert or notification determined by the network connected device, the method comprising; initiating a wireless transmission of the data by the network connected device, wherein the external device is configured to sample the wireless spectrum periodically using a wireless module to receive any wireless transmissions originating from the network connected device since a previous sample was taken; if a new communication cannot be sent to the external device, storing the new communication in memory on the network connected device; upon a successful reconnection attempt between the network connected device and the external device, transmitting the new communication to the external device to enable the new communication to be stored directly in memory by the external device without displaying the new communication.

In yet another aspect, there is provided a method for enabling navigation between a plurality of interfaces or messages on an external device, the external device configured to obtain data from a network connected device, the data comprising any one or more of an alert, a notification, and a message associated with a data communication, the method comprising: providing a single input mechanism on the external device; enabling a first use of the single input mechanism to navigate within a particular user interface provided on a display of the external device; and enabling a second use of the single input mechanism to navigate between a plurality of user interfaces.

In yet another aspect, there is provided a computer readable medium comprising computer executable instructions that when executed by a computing device perform the methods above.

In yet another aspect, there is provided a system comprising one or more of a network connected device and an external device, the system being configured to perform the methods above.

BRIEF DESCRIPTION OF THE DRAWINGS

Embodiments will now be described by way of example only with reference to the appended drawings wherein:

FIG. 4F is an example GUI illustrating the display of the text of a message previously received by the network connected device on the external device.

FIG. 5 is an example GUI illustrating settings that may be displayed on the network connected device in order to customize what is displayed on the external device.

FIG. 6 is an example GUI illustrating filter settings that can be adjusted on the network connected device.

FIG. 7 is an example external device comprising a single input mechanism

DETAILED DESCRIPTION OF THE DRAWINGS

Figure 2:
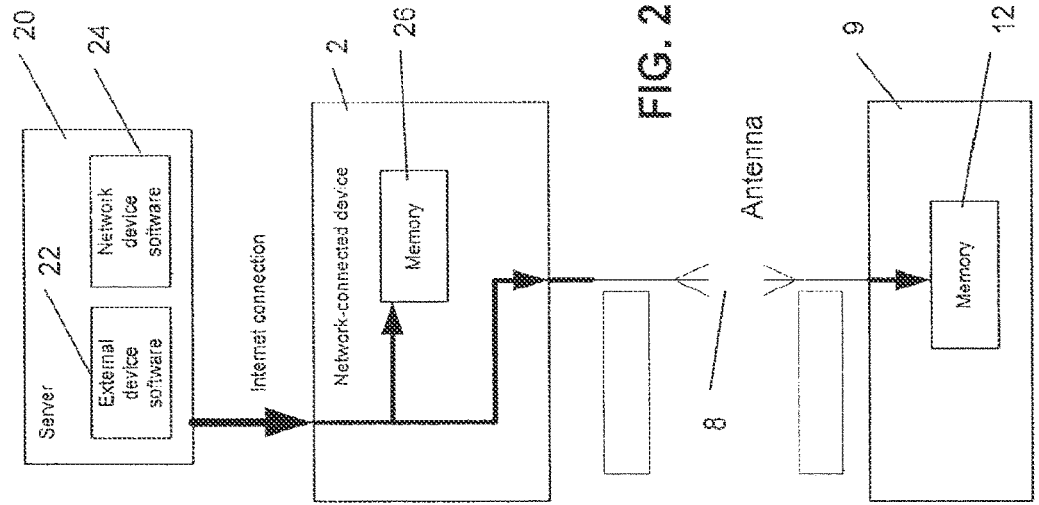
FIG. 2 is a schematic diagram illustrating a software configuration for connecting the network-connected and external devices of FIG. 1.

Problems currently faced by users of network-connected devices include the frequency of notifications that are received, which can be very distracting. Depending on where the network-connected device is kept, it may be difficult or impossible to pull it out each time it rings or vibrates and the user may not even realize that an alert or message is being missed.

The following provides a system comprising a network-connected device and an accompanying external device or accessory. The system is capable of alerting and synchronizing notifications or alerts between a network-connected device and an external device or accessory to the network-connected device. Because the synchronization is automatic and the external device listens for new broadcasted signals automatically, there is no user interaction required before new alerts are delivered and displayed. This is different than solutions such as that described by Brewer et al. as outlined above. The present solution aims to feed users with information even though they have not asked for it. It reduces the delay between when an alert occurs on a network-connected device and when the user reads or otherwise becomes aware of what information the alert is intending to convey.

A problem that exists with the prior art is that messages are stored on a device with a small display and limited input functionality. The following system removes the restriction of storage space on the devices such as pagers by only storing the most recent messages that are received on the external device. The original alerts (including older ones) are stored on the network-connected device. In practical applications, a user may find it to be timelier to search for an old message using the larger screen and additional input buttons provided by a network-connected device. Additionally, the prior art that includes pager devices or PDAs suffers in practice when a user needs to respond to a message. In these cases, a mobile phone that has its own data and/or voice plan may be required to respond to a message. With the following system, the only fees that are required to use the system are related to the mobile phone data and/or voice service. Unlike many previous solutions, the user does not need to pay a network carrier for two separate device plans.

The following system also includes the software framework for setting user preferences related to the system, and the framework to push new interfaces from the network-connected device to the external device. This is possible because the network-connected device is used to set all parameters and preferences relating to the accessory, whereas the accessory itself does not have an input method that would make changing settings convenient. Setting preferences on the network-connected device is less cumbersome, and it provides the opportunity for greater degrees of granularity and customizability of settings. Furthermore, because the network-connected device may access the internet, it may download new interface themes or designs for the accessory. The network-connected device in turn can send the selected theme to the accessory to replace what had previously been displayed. This method also removes the need for excessive memory storage on the accessory, because the network-connected device can download and push new interfaces to it as desired.

The following system also includes a method for replacing or updating the operating system of an external device by acquiring the operating system files through the network-connected device from a network location. Subsequently, the files can be transmitted to the external device to replace the existing operating system. This process is initiated by the network-connected device either automatically or by the request of the user.

The following cases illustrate problem situations that may be faced by users of network devices, and how they are addressed by aspects of the present solution:

1. A woman stores her smart phone in her purse, and frequently misses emails and phone calls because she does not hear the ringing or does not feel the vibrations. A bracelet can vibrate to alert the wearer that there is an incoming message on their phone. The user can then pull out their phone to check instead of discovering the alert hours later because they did not hear the ringing.
2. A businessman in a meeting can feel his phone vibrating, but does not want to pull it out to avoid looking distracted or being rude. He wonders if the call or email was important for the duration of his meeting. With the following system incorporated into a wristwatch, he may quickly and discreetly glance at the watch display to see who is trying to contact him. With this knowledge, he may excuse himself from the meeting if necessary.
3. An athlete is playing tennis and stores his phone in his bag at the side of the court. He does not want to be disturbed unless he receives an email or call from his wife. While wearing the system incorporated into a wristwatch accessory, the filtering functions of the system send an alert to the accessory causing it to vibrate, and the display on the accessory shows that a text message has just been received from his wife.
4. A driver is on the road and hears a ringing phone, but in order to stay focused on the road, the driver does not risk the distraction of fumbling around to see who is messaging or calling. The driver wonders if it is worth the time to stop to check what the ringing was for. With the system, an accessory may vibrate to indicate an incoming call, and a quick glance at the display of the accessory can indicate who is calling. With this knowledge, the driver may choose to stop and return the call or, realizing that it is not important, may wait until the final destination is reached to return the call.

The system proposed herein can be employed to detect alerts including, but not limited to caller identification information, received emails or text messages, calendar event notifications, stock market, weather, social networking (e.g. Facebook, Twitter, etc.), emergency notices, and news alerts that occur on a network-connected device, such as a smart phone. The networked device includes software that runs in the background of the operating system, known as a daemon, intended to catch and process alerts as they occur. The daemon and the configuration settings application that controls the behaviour of the apparatus can be installed on the networked device by visiting an external website to download and install the proper files. Alternatively, an SMS message or email may be sent by the user to an automated system that returns a message containing either the installation files or links to complete the software installation process. However, a simple modification would be to integrate the software aspect of the system within a mobile phone operating system, for example. This modification would remove the need for the user to install the software after purchasing the network-connected device and accessory separately.

Utilizing the configuration settings of the user, the daemon decides whether or not to transmit an alert from the networked device to the external device and what functions of the external device should be activated to notify the user of the presence of an alert. In alerting the user, the daemon may instruct the external device to utilize one or a combination of functions including vibrating motions, blinking diodes, blinking displays and audible noises.

The data transmission from the network device and external device can occur via a short-range wireless protocol, such as Bluetooth. A distinction between this system and previous solutions is that prior art such as Brewer et al. uses two-way data transfers to communicate or synchronize data between the two devices. The proposed system involves a one-way transfer from the networked device to the external device; however, as part of the wireless protocol being used, an acknowledgement function is built into Bluetooth devices to confirm a successful receipt of data. Furthermore, the proposed system adds support for message queuing to allow the delayed transmission of data. Thus, a wireless chip of the external device can automatically send an acknowledgement back to the network device after receiving data. In the event that the network device does not receive an acknowledgement, a retransmission will automatically begin.

Figure 1:
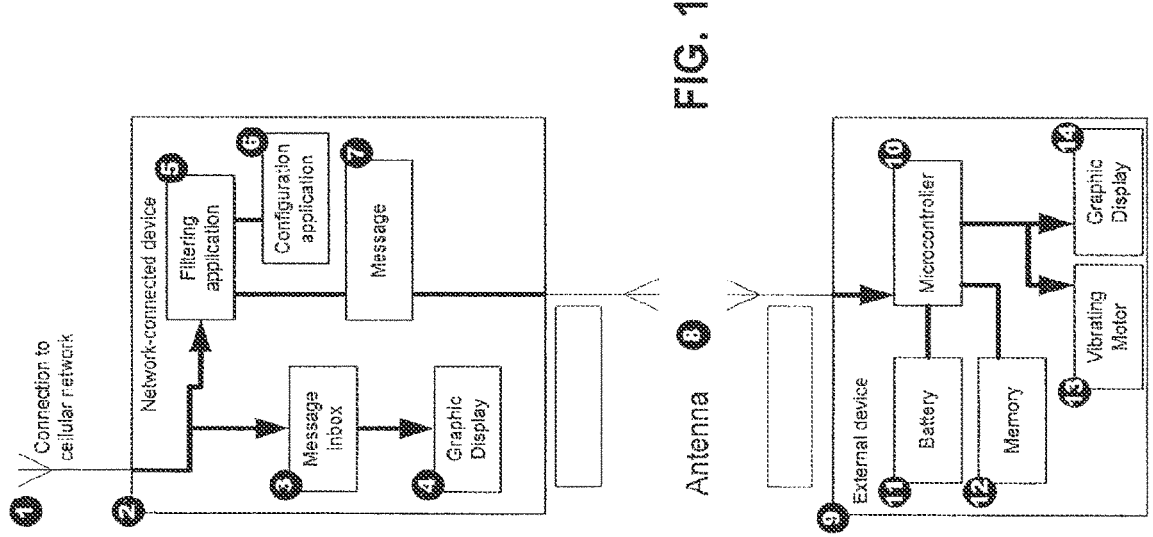
FIG. 1 is an example of a system framework comprising a network-connected device and an external device.

Components of the system that may be utilized in an implementation are shown by way of example only in FIG. 1. A network connection 1 to a cellular network via a wireless radio is shown in FIG. 1. The wireless radio (not shown) is contained within a network-connected device 2 as is well known in the art. An inbox 3 for messages contains a stream of information that is received by the wireless radio from the network. The inbox 3 may or may not be a single inbox, it may in fact be comprised of several individual data feeds of the same or different types. A typical network-connected device would have a graphical display 4 in order to directly display the contents of messages. In embodiments where there is an external device 9 present, a filtering application 5 can be installed on the network connected device 2. The filtering application 5 has the capability of halting a message from being passed from the message inbox 3 stream through to the message stream for the external device 9. The filtering settings can be customized by changing settings in a configuration application 6. The configuration application 6 allows the user to customize parameters that are used by the filtering application 5 to determine which messages should be halted and which should be allowed to continue. Messages from the network device 2 that are to be passed on to the external device 9 can have a separate message stream 7 that may be different than the main message inbox 3. Messages or alerts that pass through the filtering application 5 appear in the message stream 7. The network device 2 and external device 9 communicate via a wireless interface 8, such as Bluetooth. The external device 9 comprises a microcontroller 10, which in this example is used for implementing the present system as well as performing other tasks such as for a watch or other accessory. The microcontroller 10 is connected to a battery 11, which powers the external device 9 and the memory 12. The memory 12 stores operating system software and any received alerts. A vibrating motor 13 can be activated by the microcontroller 10 when a new message is received, as this acts an active alarm to tell the user there is a new message. Alerts are shown to the user via a graphic display 14. In order to conserve power, the microcontroller 10 may disconnect the graphic display 14 from battery power when a message is not being displayed. Actions taken by the microcontroller 10, software stored in the memory 12, and the appearance of the graphic display 14 may be controlled by the configuration application 6 from the network device 2.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the external device 9 or network connected device 2 themselves, or accessible or connectable thereto. Any application or module herein described may be implemented using computer readable/executable instructions that may be stored or otherwise held by such computer readable media.

An example will now be provided according to the example configuration in FIG. 1. A transmission from a wireless network (such as a phone call, SMS, email, news feed, etc.) is received by the network-connected device 2 and processed by the alert filtering application 5. If the filtering application 5 deems the alert should be sent to the external device 9, the network-connected device 2 processes the alert information into a message format 7 and broadcasts this information over a wireless antenna, e.g. Bluetooth connection 8. The microcontroller 10, which in this example is or comprises a wireless module, receives the alert and displays it on its graphic display 14 while optionally activating a vibrating motor 13 or other alert (e.g. flashing light, audible tone, etc.).

FIG. 2 illustrates a software configuration that may be used to setup the system, based on the example configuration shown in FIG. 1. The network-connected device 2 is capable of retrieving software from a remotely located server 20. The network device 2 downloads network device software 24 and installs and/or stores this software 24 to memory 26. The network device 2 also downloads external device software 22 from the server 20, i.e. software intended for the external device 9, which is passed directly to the external device memory 12 for storage and/or installation.

Figure 3:
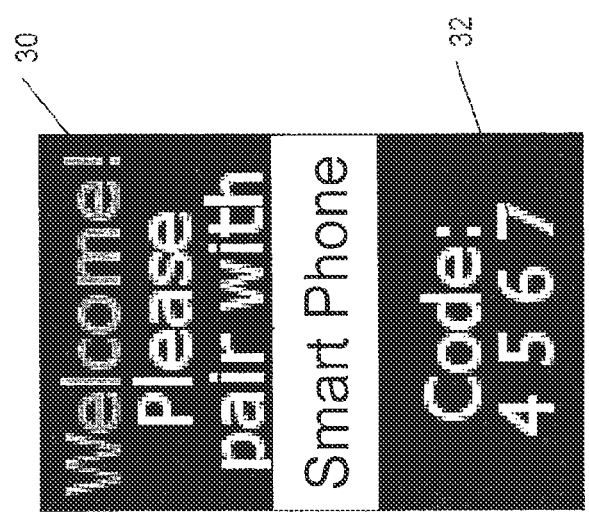
FIG. 3 shows an example graphical user interface (GUI) for presenting a code to connect the external device to the network-connected device.

FIG. 3 shows how the external device 9 may be connected to the network device 2 over the short-range connection 8 via a user interface 30. The user interface 30, which is provided on a display of the external device 9, presents the user with a code 32, which is entered manually to the network connected device 2 to establish a connection between the two devices.

Figure 4A:
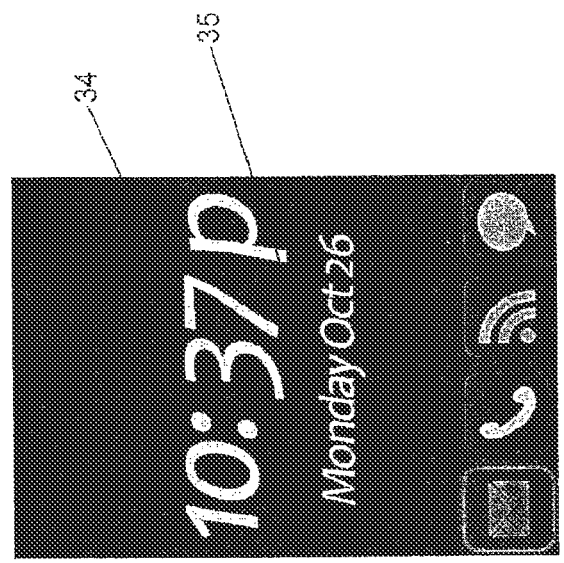
FIG. 4A is an example GUI for the external device.

The system also includes a software framework (e.g. computer executable instructions residing on the network connected device 2) for setting user preferences and pushing new interfaces to the external device 9. Examples of customized interface displays 34, 36 are shown in FIG. 4A and FIG. 4B respectively. Any aesthetic design or layout of interface displays (e.g. interfaces 34, 36) may be used to create a new display output for the external device 9. The external device hardware comprises a display 14, as shown in FIG. 1, which can display different user interfaces and themes. Through a configuration setting on the network device 2, the user can choose to have new interface designs or themes pushed to the external device 9. This functionality can completely change the appearance and style of the accessory to suit the user's desires and/or needs.

The interfaces 34, 36 in FIGS. 4A and 4B can be configured to show information including the date and time 35, battery life 37, the number of new messages of each type (not shown) and the next event (e.g. using alert icons 38). FIG. 4B shows an analog style watch face 40 along with small icons for additional information regarding battery life 37 and alerts received 38. A user may switch back and forth between such interfaces 34, 36, by changing an interface setting on the network-connected device 2, which in turn pushes the newly selected interface 34, 36 to the external device memory 12 and replaces the output on the graphic display 14.

Figure 4C:
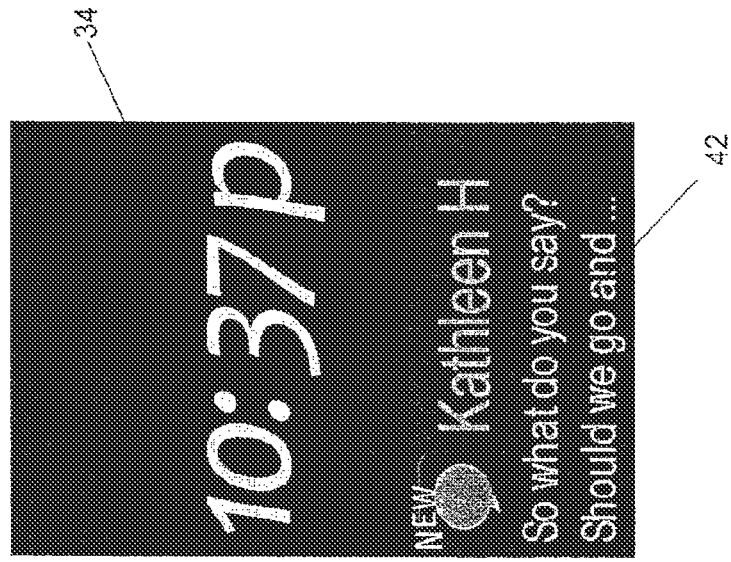
FIG. 4C is a GUI illustrating text of a new message from the network connected device being displayed on the external device.
Figure 4B:
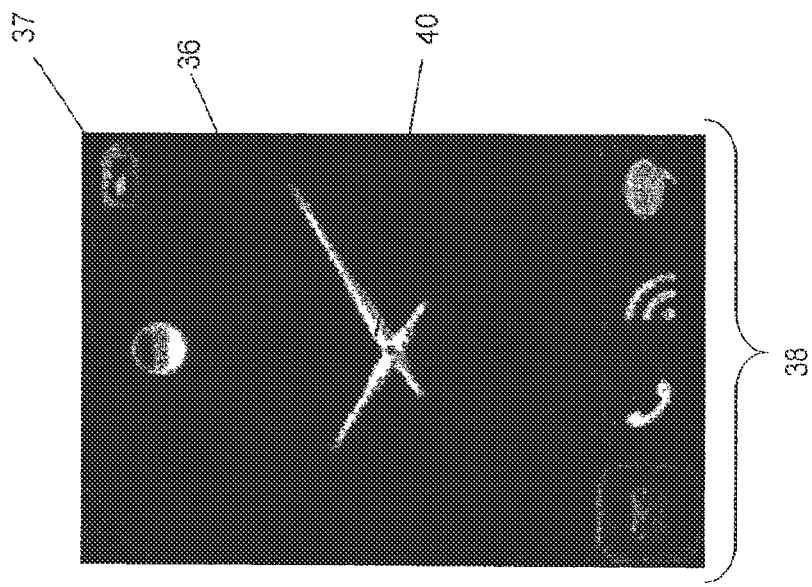
FIG. 4B is another example GUI for the external device.
Figure 4E:
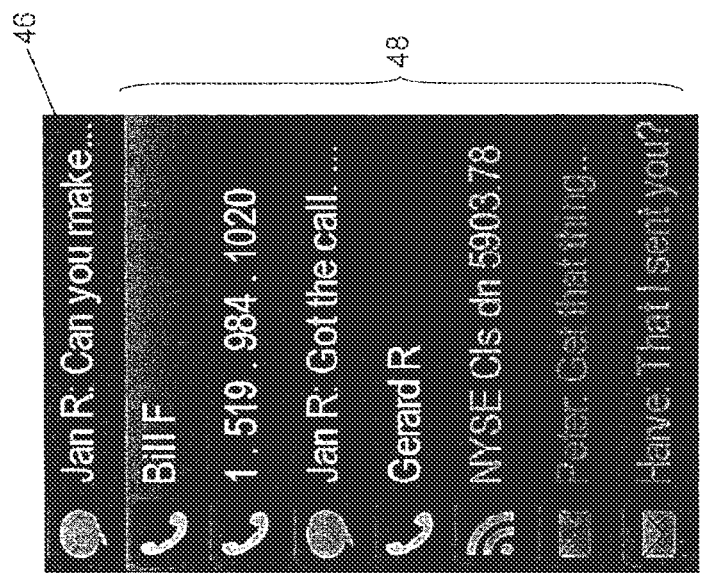
FIG. 4E is an example GUI illustrating the display of all recently received messages from the network connected device on the external device.
Figure 4D:
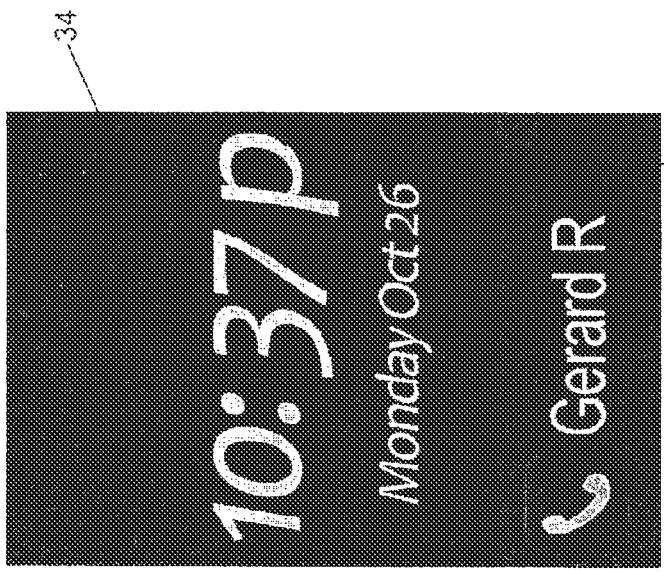
FIG. 4D is an example GUI illustrating the display of caller identification information from the network connected device on the external device.

FIG. 4C shows the text of a new message 42 being displayed in a portion of the interface 34. Similarly, FIG. 4D shows caller identification information 44 for an incoming phone call. FIG. 4E illustrates yet another interface 46, which lists all recently received messages 48 that were passed to the external device 9. Using an input mechanism such as a touchpad or button (not shown), this list 48 may be scrolled through, highlighted, selected, etc. When an item in the list 48 is selected via an input mechanism on the external device 9, the entire message 42 may be displayed to the user (e.g. as shown in FIG. 4C). Another example, shown in FIG. 4F illustrates the text of another message 50 that was previously received.

FIG. 5 illustrates a notifications user interface 52, which is used to present a list of settings 52 to the user using the display 4 of the network-connected device 2. Selectable options 56 for the respective settings 52 allow for the customization of how the external device 9 is to alert the user when a new notification of a particular type is received, whether it be through silent mode, vibration, flashing, ringing, a combination of these, to name a few possibilities.

The instructions stored on the network connected device 2 may include logic for determining which messages 42, 50 should be sent from the network-connected device 2 (i.e. the transmitting device) to the external device 9 (i.e. the receiving device). As noted above, such messages include, without limitation: caller identification information, received emails or text messages, calendar event notifications, news alerts, social networking updates, instant messages, weather, stock market information, etc. Using the parameters associated with the original transmission and using the knowledge of the current state of the user (what they are doing based on the time of day, calendar events or location) and any predefined settings (whether or not the user has set the priority of communications from a particular contact), the logic can determine whether or not an alert should be sent to the external device 9. If it is determined that an alert is not important or that it is an inappropriate time to disturb the user, the alert is halted by the filtering application 5 at the network connected device 2. If the alert is determined to be important and it is worth notifying the user, the alert is transmitted to the external device 9 and the user is notified.

A Set Filters user interface 58 shown in FIG. 6 can be used to adjust filter settings 60 using the network-connected device 2. The filter settings 60 typically vary according to what data is available to be sent to the external device 9, and the type of alerts being filtered. The filtering application 5 on the network connected device 2 can therefore be used to avoid needlessly alerting users to every notification received by the network connected device 2, which can be very distracting and even illegal in regions where cell phones have been banned while driving. Moreover, business professionals may not wish to be notified of routine or low-priority alerts, particularly if they are busy or in a meeting, for example.

In order to simplify the interactive elements of the external device 9, a one button interface 62 may be provided on the external device 9 as shown in FIG. 7. In the example shown in FIG. 7, a single input mechanism 64 (e.g. a button, accelerometer, touch-sensitive pad, etc.) is provided on the external device 9 along with the display 14. By providing inputs using the single input mechanism 64, a convenient way to navigate among the various interfaces and alerts discussed above may be achieved as shown in FIG. 8. The user may also use the input mechanism 64 to navigate between different types of alerts while only requiring one physical element to be included in the design of the external device 9. This is particularly advantageous when relying on existing input mechanisms on external devices 9 being retrofitted with the present system, or for new designs wherein the functionality described herein is desired with minimal disruption to an overall look and feel (e.g. a watch).

Figure 8:
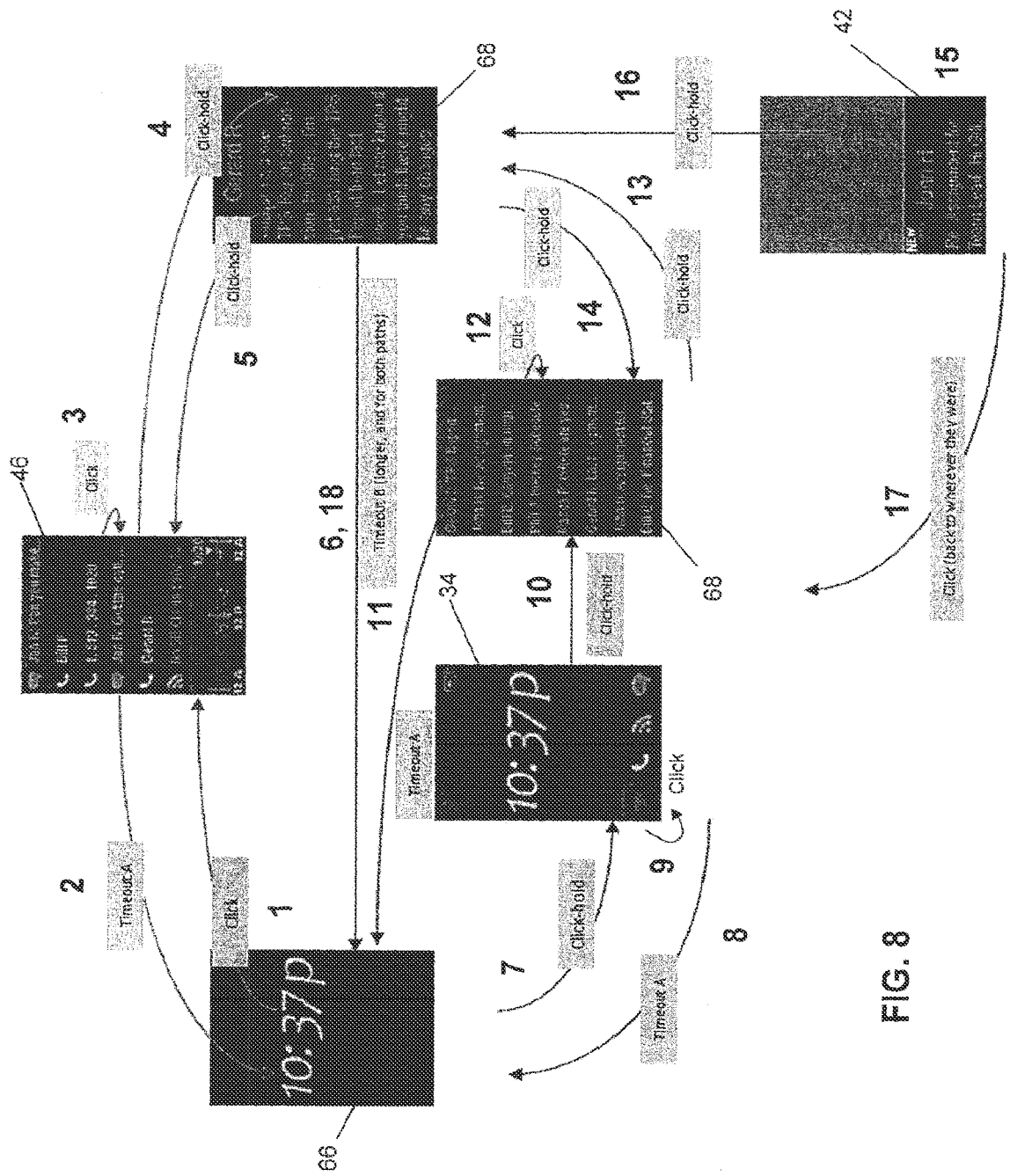
FIG. 8 is an example flow diagram illustrating a single input mechanism interface design.

Turning now to FIG. 8, a state diagram is shown to illustrate one example which enables navigation between user interfaces and messages on the external device 9 using a single input mechanism 64. At stage 1, a home screen 66 is shown, which may display a minimum number of elements (e.g. only the time as shown in FIG. 8) in order to minimize distractions and battery usage. By clicking the input mechanism 64, the recently received messages user interface 46 is immediately displayed to enable the user to quickly access the latest alerts. If nothing is done, a timeout occurs at stage 2 and the display returns to the home screen 66. If, while the user interface 46 is being displayed, a single click of the input mechanism 64 is detected at stage 3, the focus on particular messages may be cycles through the list 48. Upon detecting a click and hold (click-hold) of the input mechanism 64 at stage 4, the message from the list 48 currently highlighted is displayed. A further click-hold can then be used at stage 5 to return to the user interface 46 displaying the recently received alerts. If instead a timeout is detected, the display returns to the home screen 66 at stage 6. It can be appreciated that the timeout in stage 6 may be configured to be longer than the timeout in stage 2 in order to provide more time for the user to read the message being displayed.

When displaying the home screen 66, a click-hold can be detected at stage 7 instead of a single click. Upon detecting a click-hold of the input mechanism 64 the user interface 34 can be displayed, which, as discussed above, may include additional elements such as icons 38 corresponding to the message types. A timeout detected at this point returns the display to the home screen 66 at stage 8. A single click as shown in stage 9 can be used to navigate within the user interface 34 to select a desired message type. However, it can be appreciated that in the example shown, the desired message type happens to be the one immediately highlighted and thus stage 9 is shown only for symbolic purposes in FIG. 8. Detecting a click-hold at stage 10 may then launch the display of a user interface 68 for a particular category of messages, in this example email messages that have been received by the external device 9. If a timeout is detected at stage 11, the display may return to the home screen 66. Instead, the user may navigate down the email user interface 48 to a desired one by performing one or more single clicks at stage 12. Upon detecting a click-hold at stage 13, the particular email message that has been highlighted is displayed. A further click-hold at stage 14 would then return the display to the previous screen, namely the email user interface 68 in this example. A timeout may again be sensed or further single click or click-hold operations.

Stage 15 illustrates yet another scenario wherein a new message is shown in a portion 42 of the display 34 (e.g. similar to FIG. 4C). When a new message is displayed, if a click-hold is detected at stage 16, the display may immediately display the particular new message. If however a single click is detected at stage 17, the display can return to the previous screen, in other words effectively ignore the new message and return to what they are doing. It can be appreciated that a timeout can also be detected at stage 18 if the click-hold has been detected at stage 16.

It can therefore be appreciated that by providing a simple and consistent logical mapping to multiple functions that can be performed using the same input mechanism 64, a single input mechanism 64 can be used to navigate between interfaces and between messages in a simple and convenient manner without cluttering the design of the external device.

Important aspects and advantages of the system include the ability to filter alerts and transmit them one-way to an external device 9, as well as the framework and logic for changing the interface on an external device 9 through the use of a network-connected device 2. The external device 9 can be configured to listen for any broadcasted signal from the network connected device 2 and to receive the new data automatically. Because the data transfer is automatic and the external device 9 listens for new broadcasted signals automatically, there is no user interaction required before new alerts are delivered and displayed. This is particularly advantageous when compared to solutions such as Brewer et al., as it aims to feed users with information even though they have not asked for it, which reduces the delay between when the user receives an alert and when they read it. By enabling the user to customize the user interfaces, in particular to filter certain alert types or to limit the number of new alerts shown, the user can balance the competing objectives of getting the information in a timely manner and avoiding being overburdened with too much information.

For clarity and to summarize the principles discussed above, the following definitions may be used:

Alert/notification—may refer to, without limitation, a message, reminder or news feed (either originating from the network or the network device itself), including caller ID information, calendar event reminders, emails, SMS, RSS feeds, social media updates (e.g. Facebook, Twitter, etc.), sports score updates.

Mobile or network-connected device 2—may refer to, without limitation, an electronic device that is connected to a telecommunications network. Examples include, a cell phone, smart phone, pager, laptop, tablet computer, desktop computers, portable gaming device, and the like. These devices may have voice and/or data plan subscriptions through a wireless network provider.

External device or accessory 9—A device that is wirelessly connected to the network connected device 2. The external device 9 communicates with the network connected device 2 to receive alerts occurring on the network connected device 2 and to receive new interfaces to display thereon.

Downloadable interface—A device with an interface displayed on a screen may have its interface display changed. This may be done to reconfigure characteristics such as, but not limited to, the layout, color, style, or size of fonts. In the case of this system, new interfaces may be "pushed" to the external device 9 by the network connected device 2 along with new images and layouts.

Figure 9:
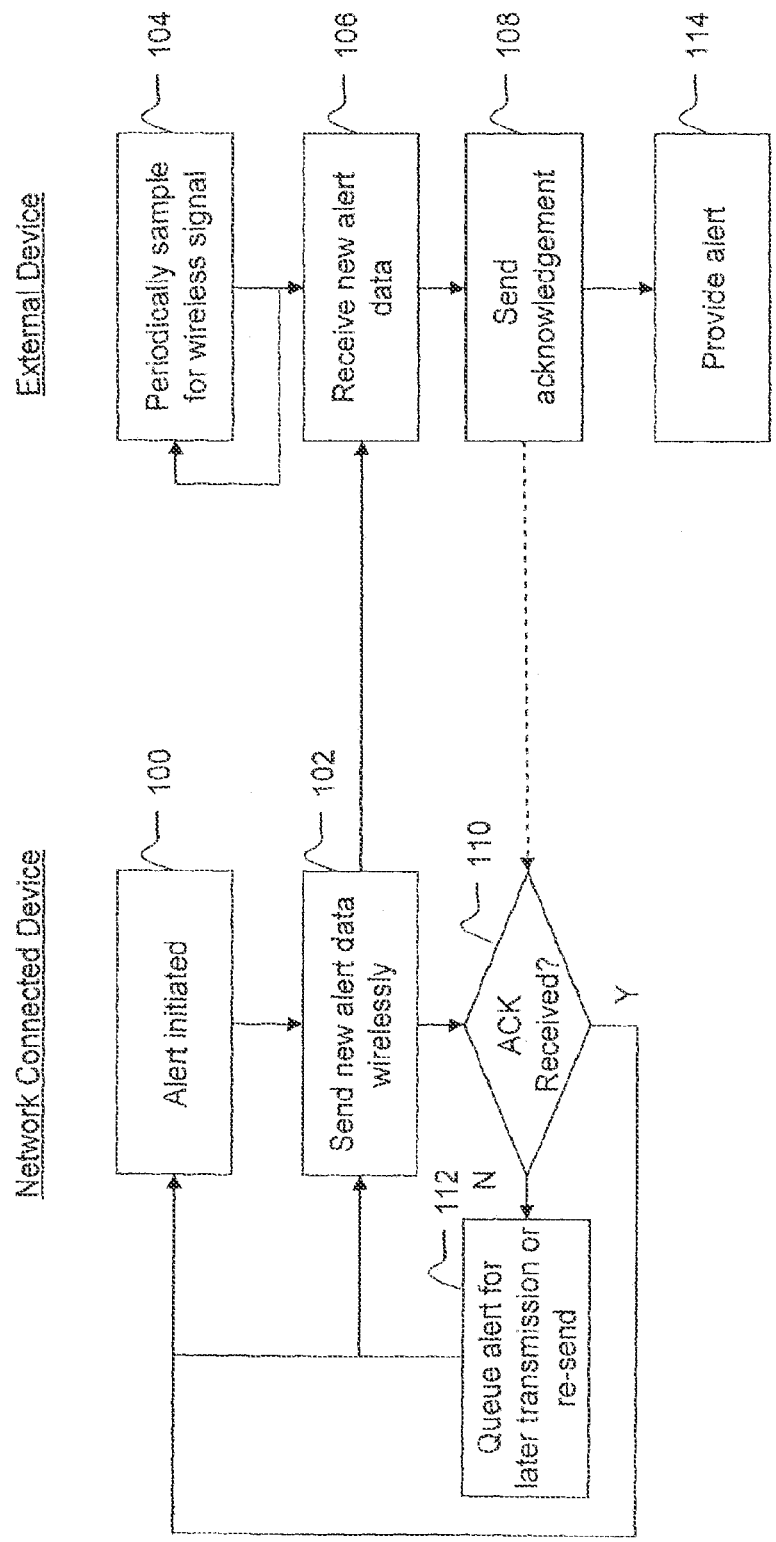
FIG. 9 is a flow chart illustrating an example set of computer executable instructions for sending alerts from a network connected device to an external device.

Turning now to FIG. 9, an example set of computer executable instructions is shown for communicating between a network connected device 2 and an external device 9 to enable the external device 9 to provide alerts or notifications originating from the network or the network connected device 2. At 100, an alert is initiated. This may be done according to a trigger, whether it originated from the network (such as a phone call) or the network connected device 2 (such as a calendar reminder or alarm). The network connected device 2 wirelessly broadcasts or otherwise sends the new alert data at 102. The external device 9, which in the above examples periodically samples for a wireless signal from the network connected device at 104, receives the new alert data at 106. The external device 9 then returns an acknowledgement signal to the network-connected device 2 at 108, to confirm a successful data transfer. The network connected device 2 may check for such an acknowledgement at 110. If an acknowledgement is not received by the network connected device 2, the alert may be queued or a retransmission of the alert initiated at 112. The external device 9 meanwhile notifies the user of newly received data at 114. Providing the new data may be done, for example, through the use of a vibrating motor located in the external device 9, by changing the visible state of the external device 9 or its display 14 in some manner such as by changing the colour of an LED status indicator or by producing an auditory alert, etc.

Figure 10:
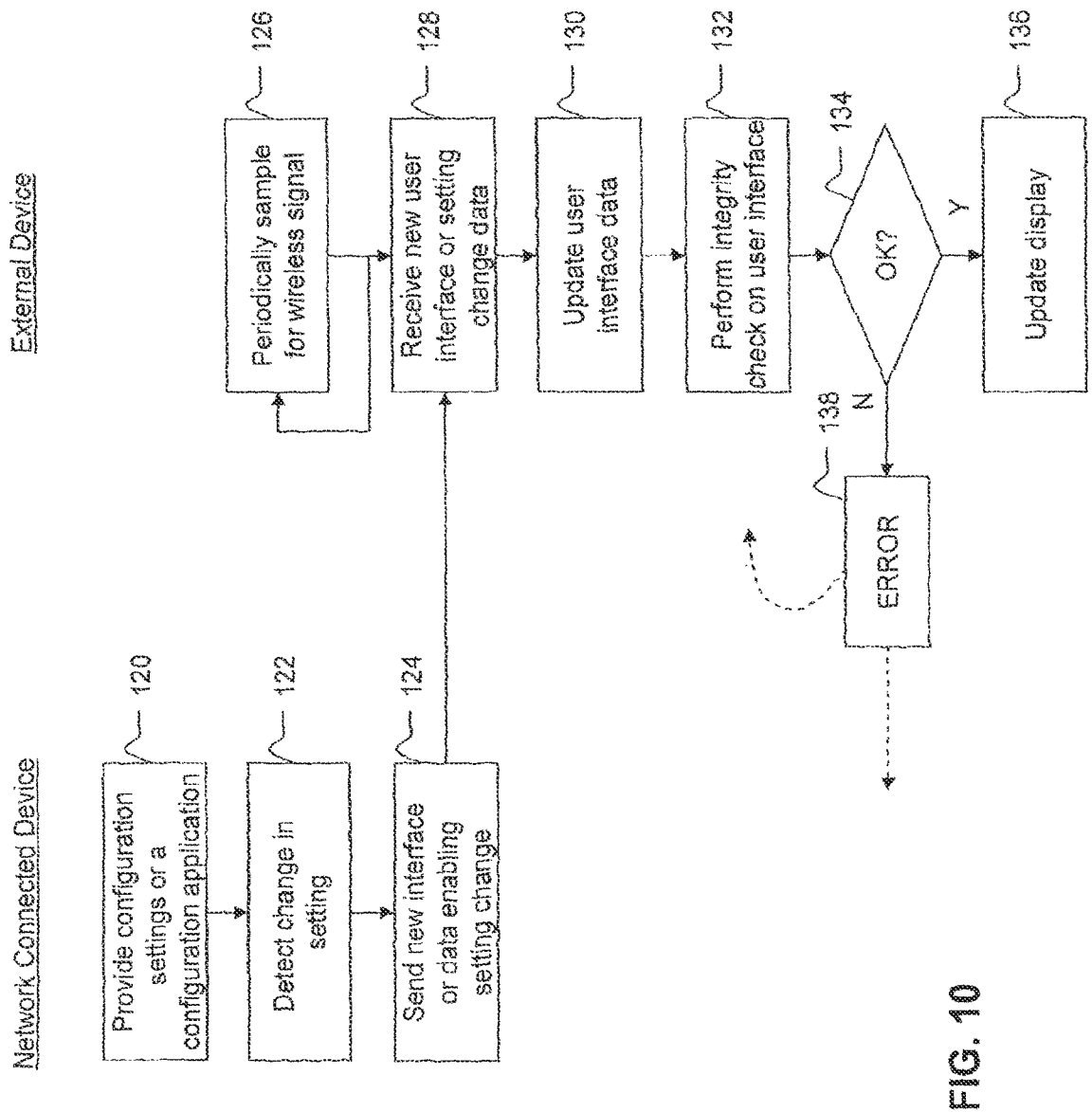
FIG. 10 is a flow chart illustrating an example set of computer executable instructions for enabling settings and parameters of a user interface on an external device to be updated on a network device.

FIG. 10 illustrates an example set of computer executable instructions that may be performed by the system for pushing a new interface from a network connected device 2 to an external device 9. At 120 the network connected device 2 provides configuration settings or a configuration application to enable the user to make changes to the user interface for the external device 9. At 122, the network connected device 2 detects a change in a particular setting from a current setting to a new setting, e.g. to load a new interface, theme, or changes to fonts, sizes and colours of an existing interface to name a few examples. The new interface display, theme, or data comprising instructions for a setting change is then sent by the network connected device 2 to the external device 9 at 124.

The external device 9, which samples for a wireless signal from the network connected device 2 periodically at 126, receives the new data at 128. It can be appreciated that an entirely new user interface can be provided (e.g. new interface file) or a configuration file that includes one or more settings that are to be applied to the existing interface (e.g. including changes in fonts, sizes, and colours), by simply transferring a configuration file form the network connected device 2 to the external device 9. The external device 9 then updates the user interface data at 130, e.g. by replacing the data in its memory relating to its interface display layout and appearance, with the new information by saving it to memory. The new data may then be verified by performing an integrity check at 132. If it is determined at 134 that the integrity check is successful, the external device 9 updates its display to reflect the new interface configuration setting at 136. If the integrity check is not successful, an error can be generated at 138, which may be displayed or otherwise provided on the external device 9 or by communicating back to the network connected device 2.

Figure 11:
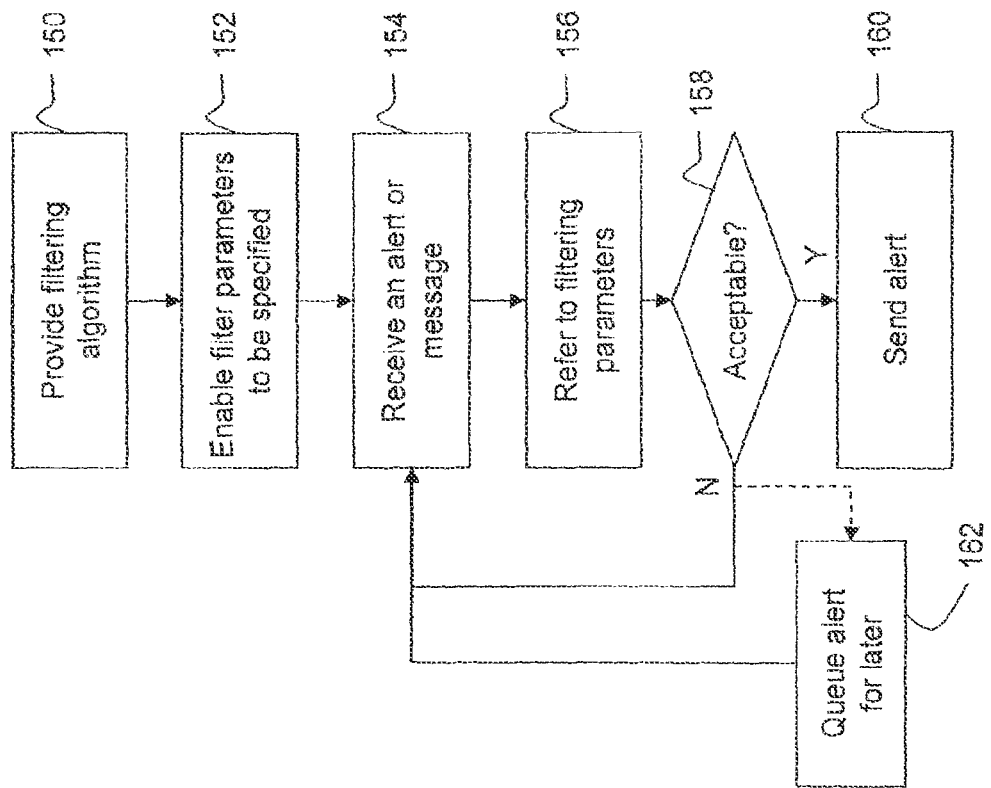
FIG. 11 is a flow chart illustrating an example set of computer executable instructions for filtering alerts on a network connected device.

FIG. 11 illustrates an example set of computer executable instructions for determining which alerts and messages to provide to the external device, and which alerts and messages are important enough to actively notify the user. At 150, the network connected device 2 provides a filtering algorithm, e.g. an application 5 running on the network connected device 2 to perform the filtering as new alerts and messages are detected. At 152, the network connected device 2, e.g. through the filtering application 5, enables parameters to be set in order to dictate within the application 5 running on the network connected device 2, the parameters that may be used by the filtering algorithm to determine the priority of alerts or messages based on the status of the user at the time they are received, the current location, the time of day, or based on who the alert is related to (if applicable), etc. A new message or alert received or detected at 154 may then cause the filtering application 5 to refer to the filtering parameters at 156. If it is determined at 158 that the filtering algorithm deems it acceptable to alert the user, the network connected device 2 broadcasts the appropriate alert for the external device 9 at 160. The external device 9 may then receive and process an alert as shown in FIG. 9. Otherwise, no data is broadcast and the state of the external device 9 is unchanged. It can be appreciated that, as shown in step 162, the network connected device 2 may be configured to queue data for later. This may be done by waiting until it is appropriate to send the alert or message or by simply sending the alert or message along with the next alert or message so that the external device 9 can store it directly into memory without visibly alerting the user. This allows the alert or message to still get to the external device 9 without necessarily having to actively notify the user. The user would then be able to find the alert or message when browsing through recently received data at some later time.

Figure 12:
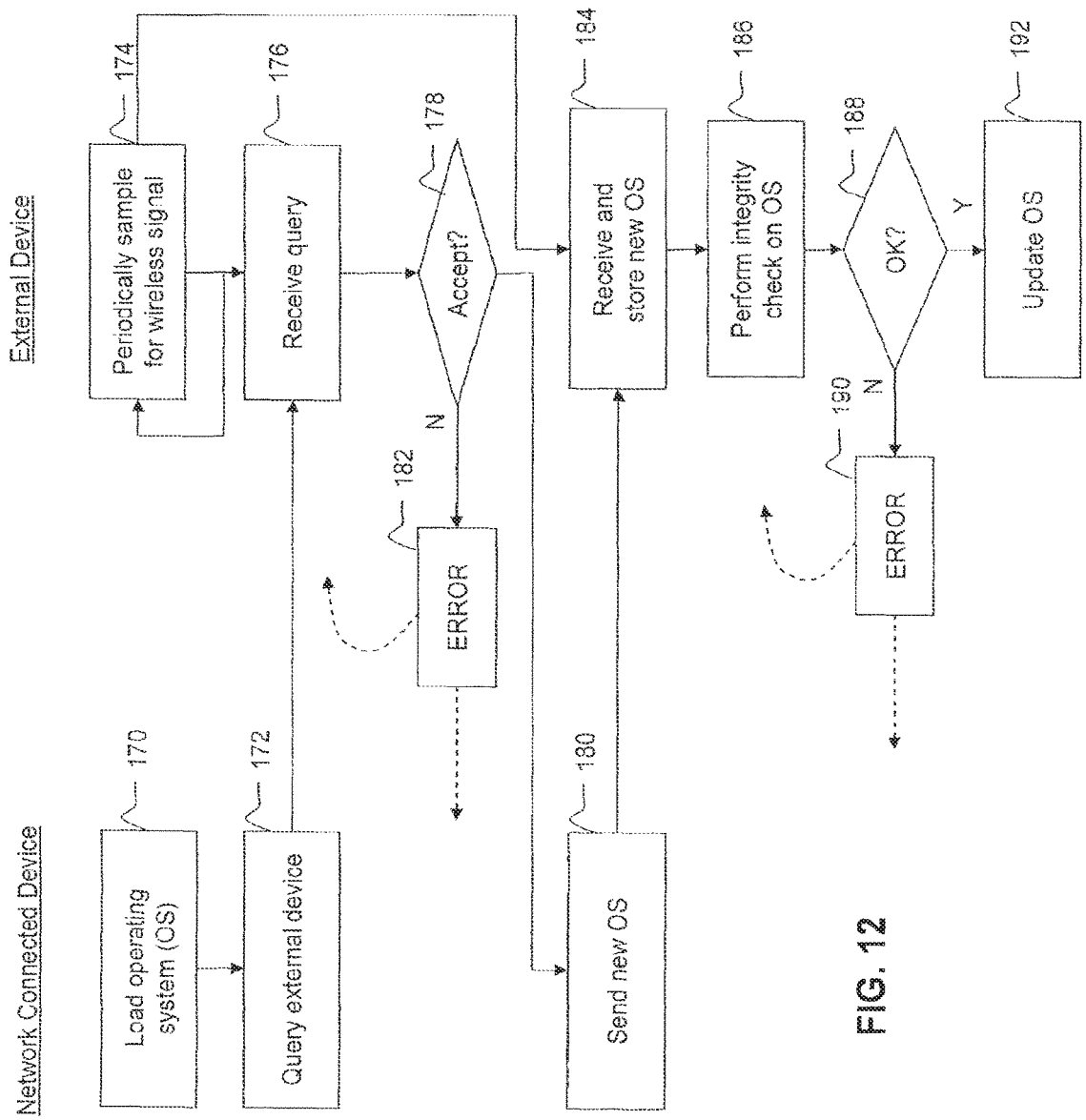
FIG. 12 is a flow chart illustrating an example set of computer executable instructions for enabling an operating system for an external device to be updated using a network connected device.

FIG. 12 illustrates a set of computer executable operations that may be performing in replacing the operating system of an external device 9 using the network-connected device 2. The operating system may be first acquired from a network source 20, and in turn transmitted to the external device 9. This process may be initiated on the network connected device 2 either automatically or as a manually initiated software update. As shown in FIG. 12, the operating system may be replaced by loading an updated configuration application onto the network connected device 2 at 170. The network connected device 2 then queries the external device 9 at 172, which is received by the external device 9 at 176, and enables the network connected device 2 to determine if the external device 9 can accept the updated operating system. The external device 9, which samples for a wireless signal from the network connected device 2 periodically at 174, receives the query at 176. The external device 9 determines at 178 if it can accept. If so, the new operating system is sent by the network connected device 2 to the external device 9 at 180, e.g. as a stream of data. If not, an error may be generated at 182, and can be provided on the external device 9, to the network connected device 2, or both. The external device 9, which samples for a wireless signal from the network connected device 2 periodically at 174, receives the new data at 184 and stores the new OS to memory, e.g. in a specific block of memory outside of the existing operating system on the external device 9. The new data undergoes an integrity check at 186 and, if the integrity check is deemed to be successful at 188, the external device 9 updates its internal memory to the new operating system at 192. Otherwise, an error may be generated at 182, and can be provided on the external device 9, to the network connected device 2, or both.

It can be appreciated that the methods above can be configured such that the external device samples the wireless radio frequency spectrum periodically and without user intervention to receive new data from the network-connected device.

A system to conserve power is also provided, wherein the majority of data transfer of the above methods is a one-way communication. This may be accomplished by having a wireless transmission of data be initiated by the network connected device 2. A wireless module within the external device 9 may then sample the wireless spectrum periodically to receive any wireless transmissions that may have originated from the network connected device 2 since the last sample was taken. If the sampled data is not already stored in the memory 12 of the external device 9 from a previous data sample, the memory 12 within the external device 9 is updated to include the new communication from the network connected device 2. A transmission may then be made from the external device 9 back to the network connected device 2 to confirm data was received. The transmission can be an acknowledgement only, with no other data being transferred back to the network connected device 2. If no acknowledgement of a successful data transfer is received by the network connected device 2, a retransmission may then be initiated automatically.

The examples chosen and descriptions presented are intended to best explain the system and applicable scenarios in which it may be used. This is not intended to be an exhaustive list, nor should it limit the system to a particular form in a provided example.

The invention claimed is:

1. An accessory device for receiving notifications from a mobile end-user device, the accessory device comprising:
   a wireless interface configured to receive at least one notification included in a subsequent data transmission directly from the mobile end-user device via a short-range wireless protocol, the subsequent data transmission having been generated by the mobile end-user device and addressed to the accessory device by the mobile end-user device,
   wherein at least some contents of the notification from the subsequent data transmission are the same as at least some contents of a notification within an earlier data transmission received by the mobile end-user device,
   where the notification with the subsequent data transmission is configured to be filtered by a filtering application on the mobile end-user device based on the contents in the notification with the subsequent data transmission to determine whether to send the notification with the subsequent data transmission to the accessory device,
   a memory coupled to the wireless interface and configured to store one or more of the notifications,
   an output device to provide information to a user, and
   a processor coupled to the wireless interface, the memory and the output device, where the processor is configured to review the notifications stored in the memory and notify a user of the accessory device by using the output device when a notification has been received.

2. The accessory device of claim 1,
   wherein at least one filtering parameter also considered in the determination whether to send further includes prioritization information related to communications from a particular contact.

3. The accessory device of claim 1,
wherein at least one filtering parameter also considered in the determination whether to send further includes information regarding a type of notification.

4. The accessory device of claim 1,
wherein at least one filtering parameter also considered in the determination whether to send further includes current state information of the accessory device.

5. The accessory device of claim 1,
wherein the wireless interface is configured to sample a wireless radio frequency spectrum periodically and without user intervention to receive data transmissions from the mobile end-user device.

6. The accessory device of claim 1,
wherein the accessory device is a watch and the mobile end-user device is a cellular phone.

7. The accessory device of claim 1, further comprising:
a user input element coupled to the processor,
wherein the output device includes a display, and
wherein the processor is configured to receive at least one user input from the user input element and in response cause the display to display additional information related to the notification that has been received.

8. The accessory device of claim 1,
where the mobile end-user device is configured to queue one or more additional notifications other than the at least one notification of the subsequent data transmission,
wherein the mobile end-user device is configured to send the one or more additional notifications at a subsequent time to the at least one notification of the subsequent data transmission, and
wherein the subsequent time is determined by the filtering application on the mobile end-user device.

9. A mobile end-user device connected to a network and for sending notifications to an accessory device, the mobile end-user device comprising:
a memory configured to store one or more notifications,
a processor coupled to the memory and configured to execute a filtering application to review the notifications stored in the memory and apply at least one filtering parameter to the notifications based on whether at least some contents of a second notification contained in a subsequent data transmission are the same as at least some contents of a first notification contained in an earlier data transmission, and
a wireless interface coupled to the processor and configured to transmit the subsequent data transmission directly to the accessory device via a short-range wireless protocol when the second notification contained in the subsequent data transmission has not been filtered out by the filtering application.

10. The mobile end-user device of claim 9,
wherein at least one filtering parameter also considered in the determination whether to send includes prioritization information related to communications from a particular contact.

11. The mobile end-user device of claim 9,
wherein at least one filtering parameter also considered in the determination whether to send includes information regarding a type of notification.

12. The mobile end-user device of claim 9,
wherein at least one filtering parameter also considered in the determination whether to send includes current state information of the accessory device.

13. The mobile end-user device of claim 9,
wherein the accessory device is a watch, and the mobile end-user device is a cellular phone.

14. The mobile end-user device of claim 9,
where the mobile end-user device is configured to queue one or more additional notifications other than the first notification of the earlier data transmission,
wherein the mobile end-user device is configured to send the one or more additional notifications at a subsequent time to the first notification of the earlier data transmission, and
wherein the subsequent time is determined by the filtering application on the mobile end-user device.

15. A method for notifying a user of an accessory device of notifications sent to a mobile end-user device, comprising the steps of:
receiving by the accessory device an earlier data transmission containing a first notification sent from the mobile end-user device via a short-range wireless communication protocol, the earlier data transmission having been generated by the mobile end-user device and addressed to the accessory device by the mobile end-user device,
wherein at least some contents of the first notification of the earlier data transmission are the same as at least some contents of a second notification within a subsequent data transmission received by the mobile end-user device from a network,
determining whether the second notification within the subsequent data transmission is to be filtered by a filtering application based on whether at least some contents of the second notification of the subsequent data transmission are the same as at least some contents of the first notification within the earlier data transmission, whether
storing one or more notifications in memory of the accessory device,
reviewing the notifications stored in the memory, and
notifying the user of the accessory device that the second notification from the subsequent data transmission has been received when the determination is made that no filtering is to occur; and thus, the second notification for the subsequent data transmission is sent to the accessory device.

16. The method of claim 15,
wherein at least one filtering parameter also considered in the determination whether to send includes prioritization information related to communications from a particular contact.

17. The method of claim 15,
wherein at least one filtering parameter also considered in the determination whether to send includes information regarding a type of notification.

18. The method of claim 15,
wherein at least one filtering parameter also considered in the determination whether to send includes current state information of the accessory device.

19. The method of claim 15, further comprising
sampling a wireless radio frequency spectrum periodically and without user intervention to receive data transmissions from the mobile end-user device.

20. The method of claim 15,
wherein the accessory device is a watch and the mobile end-user device is a cellular phone.

21. The method of claim 15,
where the mobile end-user device is configured to queue one or more additional notifications other than the first notification of the earlier data transmission,
wherein the mobile end-user device is configured to send the one or more additional notifications at a subsequent time to the first notification of the earlier data transmission, and
wherein the subsequent time is determined by the filtering application on the mobile end-user device.

22. A method for alerting a user of an accessory device of a notification sent to a mobile end-user device, comprising the steps of:
receiving by a mobile end-user device a first data transmission from a network, wherein the first data transmission includes a first notification;
storing the first notification in memory of the mobile end-user device;
executing a filtering application and reviewing the first notification stored in the memory;
applying at least one filtering parameter to the first notification based on content associated with the first notification by the filtering application of the mobile end-user device to determine whether to notify a user of the accessory device that the first notification has been received;
where the filtering application compares whether at least some contents of a second notification of a second data transmission are the same as at least some contents of the first notification included in the first data transmission; and
transmitting the first notification of the first data transmission to the accessory device over a short-range wireless communication protocol when the first notification is not filtered out by the filtering application.

23. The method of claim 22,
wherein at least one filtering parameter also considered in the determination whether to send includes prioritization information related to communications from a particular contact.

24. The method of claim 22,
wherein at least one filtering parameter also considered in the determination whether to send further includes information regarding a type of notification.

25. The method of claim 22,
wherein at least one filtering parameter also considered in the determination whether to send includes current state information of the accessory device.

26. The mobile end-user device of claim 22,
wherein the accessory device is a watch and the mobile end-user device is a cellular phone.

27. The method of claim 22,
where the mobile end-user device is configured to queue one or more additional notifications other than the second notification of the second data transmission,
wherein the mobile end-user device is configured to send the one or more additional notifications at a subsequent time to the second notification of the second data transmission, and
wherein the subsequent time is determined by the filtering application on the mobile end-user device.

* * * * *